Oct. 3, 1967  R. D. McGLOTHLIN  3,345,049
FLUID CONTACT APPARATUS
Filed March 25, 1966  4 Sheets-Sheet 1

Raymond D. McGlothin
INVENTOR.

BY Bertram H Mann
ATTORNEY

Oct. 3, 1967  R. D. McGLOTHLIN  3,345,049
FLUID CONTACT APPARATUS
Filed March 25, 1966  4 Sheets-Sheet 2
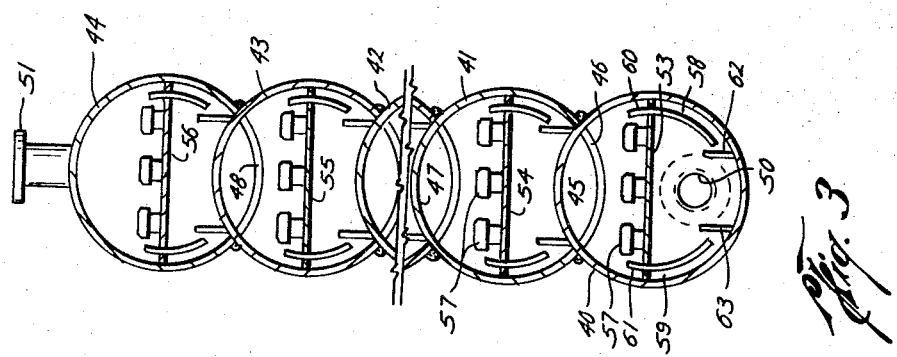
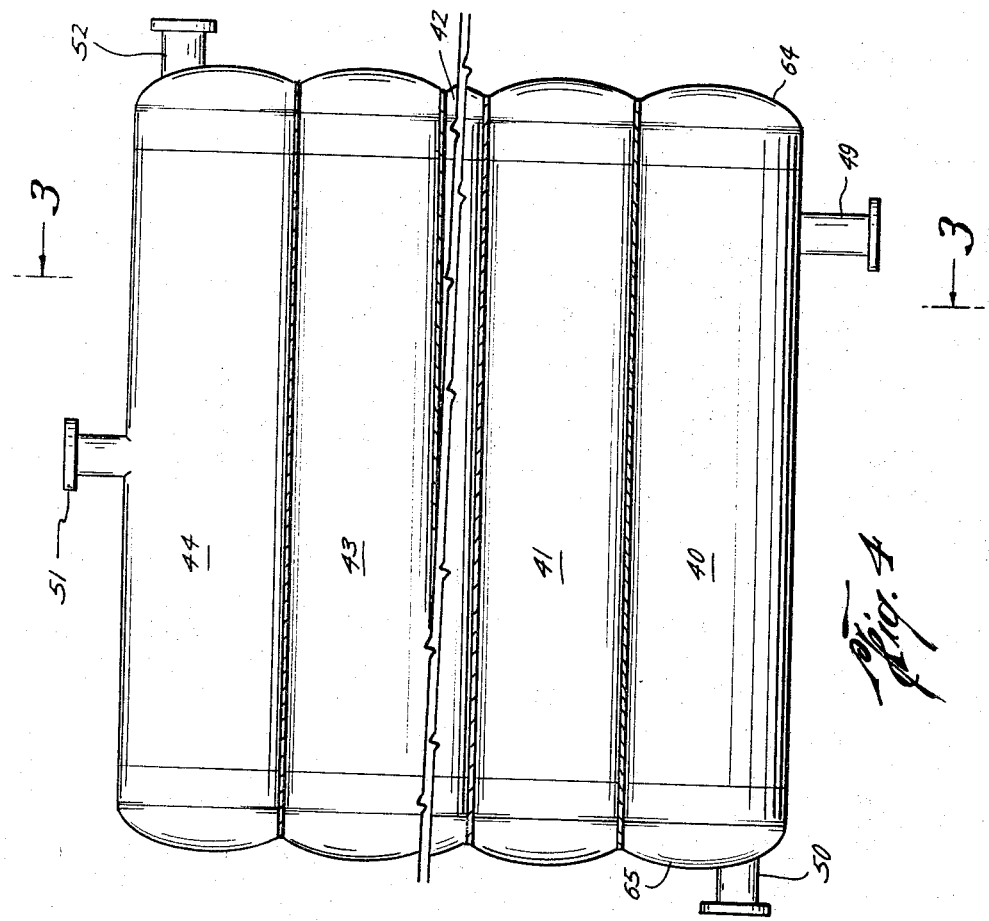
Raymond D. McGlothin
INVENTOR.
BY Bertram A. Mann
ATTORNEY Oct. 3, 1967  R. D. McGLOTHLIN  3,345,049
FLUID CONTACT APPARATUS
Filed March 25, 1966  4 Sheets-Sheet 3
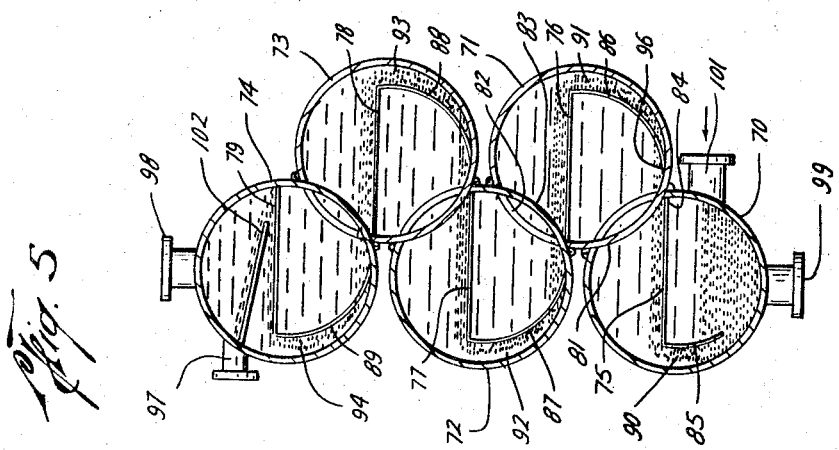
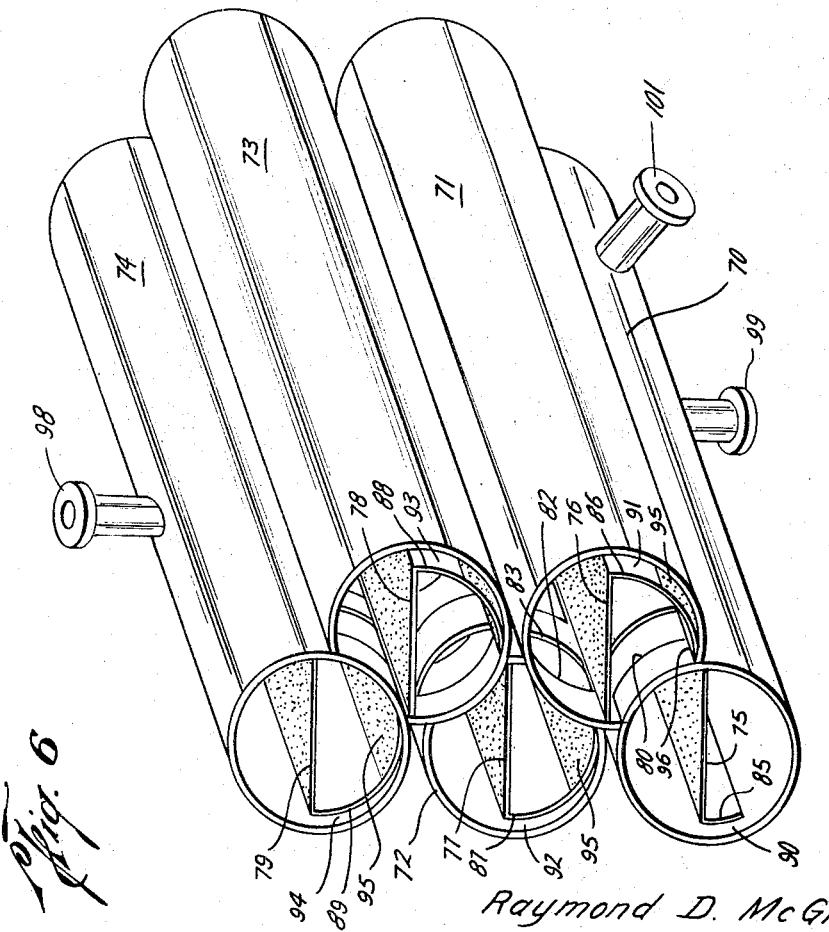
Raymond D. McGlothin
INVENTOR.
BY Bertram H. Mann
ATTORNEY Oct. 3, 1967 R. D. McGLOTHLIN 3,345,049
FLUID CONTACT APPARATUS
Filed March 25, 1966 4 Sheets-Sheet 4
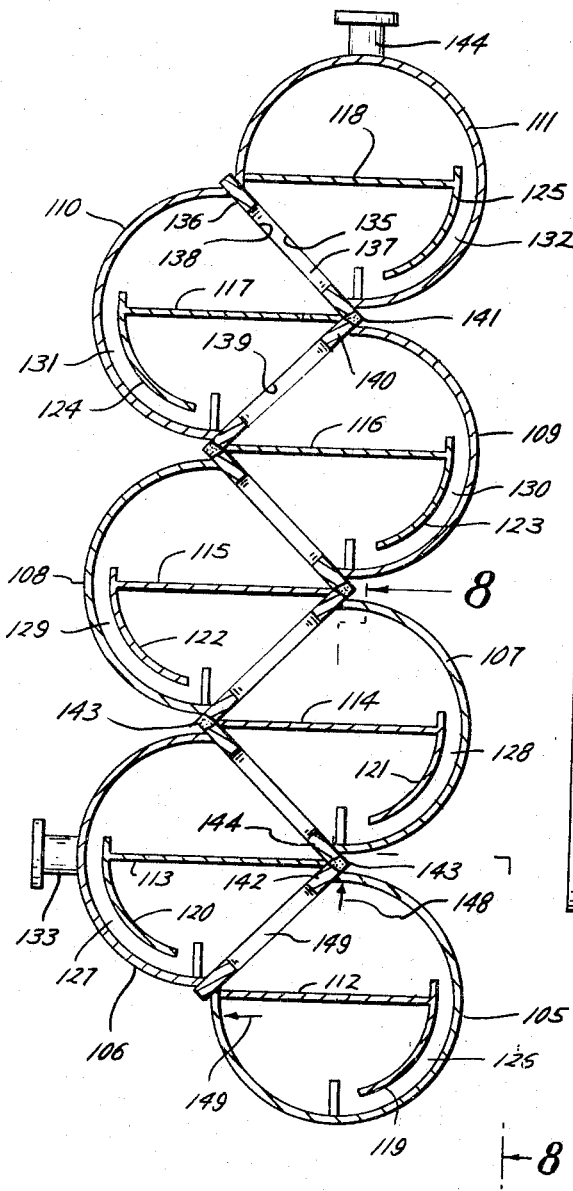
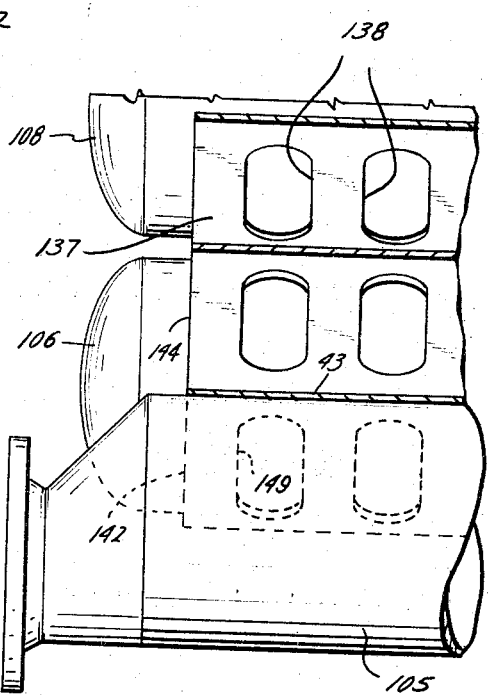
Raymond D. McGlothin
INVENTOR.
BY Bertram H. Mann
ATTORNEY – # United States Patent Office 3,345,049
Patented Oct. 3, 1967

3,345,049
FLUID CONTACT APPARATUS
Raymond D. McGlothlin, 2202 Campus Court,
Abilene, Tex. 79601
Filed Mar. 25, 1966, Ser. No. 537,374
10 Claims. (Cl. 261—114)

This application is a continuation-in-part of my application Ser. No. 364,438 filed May 4, 1964 now abandoned.

This invention relates to fluid treating apparatus particularly of the type embodying a vessel having one or more trays for supporting a first material, fluid or solid, in position for intimate contact by a second, fluent material.

Treating vessels of the type mentioned are used in fractionating, refining, distilling, separating, extracting, purification, washing, stripping, dephlegmation, dehydration, catalysis, and like operations in which two fluids, as a gas and a liquid or two liquids, or a fluid and a solid, are brought into intimate contact. Conventionally in such operations, a first material is supported on a tray or trays traversing a vertically-disposed column or tower and the second, fluid material is caused to bubble or trickle or otherwise pass through or across the tray-supported material. More specifically, in a rectifying or fractionating column, for instance, the feed stock such as crude petroleum enters the top of the column and flows downwardly across and around vertically-stacked trays of various types to the bottom of the column or tower where heat may be applied to stimulate further vaporization. The lighter constituents released from the down-flowing liquid rise through the trays and the reflux liquid is trapped thereon in such a way that the gases progressively lose their higher boiling constituents while the liquids progressively lose their lower boiling constituents. In catalytic cracking of petroleum and dehydration, fluids flow upwardly or downwardly through beds of catalyzer or deliquescent material. In still another example, a relatively light feed stock may be admitted to the lower part of a vessel, while a heavier solvent is admitted at the top. The trays will be arranged to direct the solvent in layers back and forth across the vessel as it descends. The feed rises through the solvent which extracts a certain component or components. The extract is removed from the bottom of the vessel while the raffinate is removed at the top.

A problem in all such vessels is that, in order to increase the tray area and, therefore, the capacity of the apparatus, it is necessary to extend the vessel upwardly, multiplying the trays, or to increase the diameter of the vessel. In the former case, erection, support, and maintenance problems are increased. In the latter case, the thickness of the metal walls must be increased to withstand the pressures involved, thus increasing the cost and bulk of the equipment.

Accordingly, an important object of the present invention is to provide a treating vessel of the general type described in which the area of the trays may be increased without necessarily increasing the diameter and wall thickness of the enclosing vessel.

Another object is to provide treating apparatus of the type described including means for increasing the capacity thereof without increasing the cost in the proportion as has been heretofore necessary.

Another object is to provide a vessel of the type described in which the height of the vessel is substantially less than in previous equipment embodying comparable tray area.

Another object is to provide treating equipment of the type described in which the weight is more widely distributed than in previous devices of the same general type.

Still another object is to provide treating apparatus of the type described embodying individual shell sections which are rigidly secured together and which may be more easly repaired or individually replaced in case of rupture, than has been the case heretofore.

In carrying out these objects, I provide a treating vessel embodying a plurality of preferably tubular, horizontally-disposed housings or shells arranged in stacked, side-by-side, laterally-communicating relationship. In each section there is provided a tray structure extending longitudinally or axially of the shell and passaging for conducting the fluid component or components progressively across the shells and through or across the material on the trays in the optimum contacting and/or counterflow manner.

In the accompanying drawings:

FIG. 3 is a view similar to FIG. 1 but showing a slightly modified form of treating vessel;

FIG. 4 is a side view of a vessel in accordance with FIG. 3;

FIG. 5 is a vertical transverse section illustrating a liquid-liquid extractor type of vessel embodying the invention;

FIG. 6 is an isometric view of the modified vessel shown in FIG. 5;

FIG. 7 is a vertical transverse section through still another modified form of treating vessel; and FIG. 8 is a partial side view and section on line 8—8 of FIG. 7 showing the lower part of the structure in FIG. 7.

Figure 1:
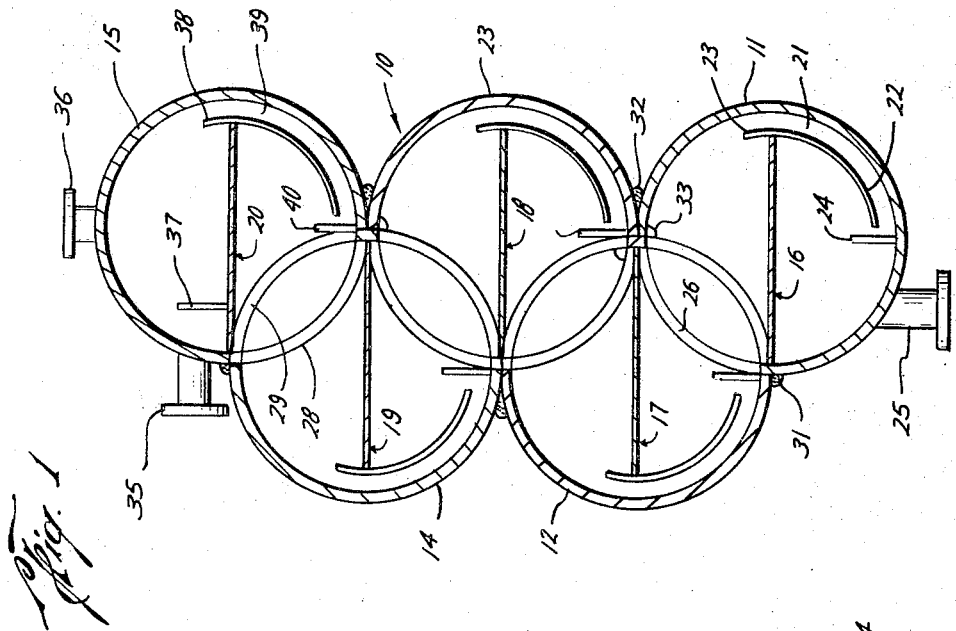
FIG. 1 is a vertical transverse section through a treating vessel according to one form of the invention.

The forms in FIGS. 1, 2, 3, 4, 7, and 8 are intended for use as fractionating or rectifying devices in which a volatile liquid is admitted at the top and flows progressively downwardly across and around trays progressively releasing lighter constituents which rise through holes in the trays and through the reflux liquid supported on the trays. FIG. 1 shows a vessel, generally designated 10, consisting of a plurality, in this case five, of cylindrical sections 11, 12, 13, 14, and 15. Bottom section 11 is equipped with a longitudinal apertured tray structure 16 of any suitable design as, for instance, shown in FIG. 3. Similar trays 17, 18, 19, and 20 are longitudinally mounted in approximately the central portions of the other cylindrical sections. Lowermost tray 16 is welded or otherwise secured at its left edge to the wall or shell of section 11 and, at its right edge, terminates short of the shell to form a downcomer space 21 defined by an inner, curved plate 22 described on the same axis as cylinder shell 11. Plate 22 projects slightly above tray structure 16, as at 23, to form a weir or dam for collecting liquid on the tray at a predetermined depth. Projecting above the floor of cylinder shell 11 is a longitudinal baffle plate 24 abreast and slightly spaced from the lower end of downcomer 21 for providing a liquid seal at this point. A bottoms discharge connections 25 projects downwardly from the bottom section.

The bottom section shell, at its upper left quadrant, is provided with a row of partial circumferential slots forming spaced ribs 26. All of the cylindrical sections are provided with similar circumferential slots and spaced ribs located in quadrature and staggered so that the cylinders can be vertically stacked and laterally interlocked in the manner shown. The slotted construction of the upper two sections 14 and 15 is better illustrated in FIG. 2, the uppermost sections 15 having a single row of spaced circumferential ribs 28 while the second uppermost section 14 has two such rows, as at 29 and 30. All of the sections are provided with horizontal trays, downcomers, and weirs or baffles corresponding ot the parts 16, 22, 23, and 24 previously described. Thus, in the assembled vessel, a tortuous path is provided from section to section through the interfitting ribs and slots. The abutting sections are sealingly secured together by means of welded seams, as indicated at 31, 32, and 33, and others as needed. The internal construction of the cylindrical sections is similar, except that the positions of the downcomers are alternated in successive sections. Upper section 15 is provided with a connection 35 for feed stock and a discharge connection 36 for released gases. A baffle 37 projects from uppermost tray 20 abreast and somewhat spaced inwardly from feed connection 35.

In this form, feed stock, as crude petroleum, is admitted to the top of the vessel as through connection 35, then flows over baffle 37 and rightwardly across tray structure 20 upon which a volume of liquid is accumulated by weir 38. The liquid spills over the weir, then passes through uppermost downcomer 39 and out from the bottom thereof where a liquid seal is preserved by baffle 40. The liquid overflows baffle 40, then passes through interfitting ribs and slots 28 and 29 to next lower cylindrical section 14 where the process is repeated. As the down-flowing liquid descends successively across the casing sections and trays, the released gases rise successively through the cylindrical sections and their trays, contacting the body of liquid on each tray in the customary manner until the light ends ultimately are discharged at 36. If desired, the tray and downcomer may be omitted from upper section 15 so that this section would function simply as a header distributing the feed along the section and, therefore, the full width of the vessel. An important advantage of this structure is that the length and therefore the area of the tray may be increased without proportionately increasing the diameter or thickness of the cylindrical section. Furthermore, the movement of the fluids through the sides of and diametrically across the abutting sections, rather than longitudinally thereof, results in a travel path of the liquid which is materially shorter than would be the case in a conventional vertical fractionating tower of comparable tray area. Thus, the liquid will move more rapidly through the vessel and its capacity, therefore, will be increased.

Figure 2:
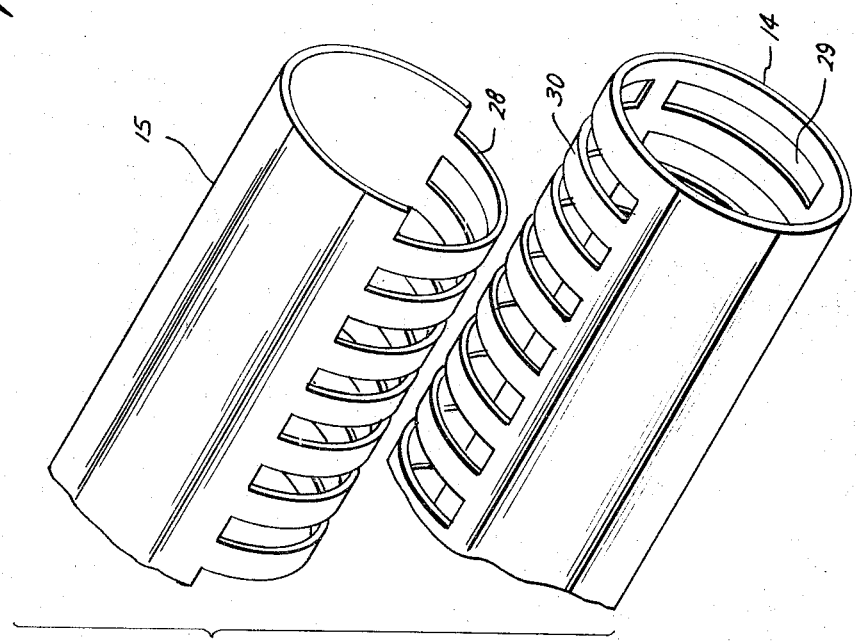
FIG. 2 is an isometric view of a pair of disassembled casing shells used in FIG. 1.

The form in FIGS. 3 and 4 is generally similar to that in FIGS. 1 and 2, except that here the cylindrical sections 40–44, inclusive, are vertically stacked and interlocked by means of partial circumferential slots and spaced ribs in the abutting wall portions of the sections, as in the previous form. Of course, bottom section 40 has a single row of slots and ribs 45 at the top, intermediate sections 41, 42, and 43 have such rows at both the top and bottom, as at 46 and 47, and top section 44 has a row of slots and ribs 48 at the bottom only. Condensate discharge connections are provided at 49 and 50 in bottom section 40, a gas discharge connection is provided at 51 in the top section 44, and a feed connection is provided at 52.

Each of the trays 53–56 is of the bubble cap type, including multitudes of apertures and registering bubble caps of known design, generally designated 57. These trays terminate short of each side of the section wall or shell, and at the sides there are provided downcomers 58 and 59 formed by curved inner walls 60 and 61, both projecting above the tray to form weirs. Liquid seal-forming dams 62 and 63 are located abreast and slightly spaced from the lower ends of the downcomers to collect liquid seals at these points. The ends of all the cylindrical sections are closed by dished end members, as 64 and 65.

This form, of course, functions quite similarly to that in FIGS. 1 and 2, the feed liquid moving successively across the trays diametrically in both directions, thence down the side downcomers and interfitting slots until reaching the bottom of the vessel, while the gases ascend in counterflow through the trays and bubble caps to the gas discharge connection 51.

FIGS. 5 and 6 illustrate a modification in which five cylindrical sections, 70–74, are interlockingly assembled in ascending, laterally-staggered manner generally similar to FIGS. 1 and 2, to form a liquid-liquid extractor vessel. The cylindrical sections are arranged on their sides—that is, with their axes extending horizontally—as in the previous forms, and perforated trays, as 75–79, are mounted therein with their surfaces also extending horizontally or axially. Portions of the section walls are circumferentially slotted in quadrature, as at 80–83, and the abutting edges of the confronting section walls are welded together to form a rigid assembly in which communication is provided laterally between the interiors of the sections through the slots and around the spaced ribs. The inner edges 84 of the perforated trays are secured, as by welding to the shell inner walls, and the opposite edges of the trays terminate short of these walls and merge with curved plates 85–89 to form downcomers 90–94. The lower portions of inner plates 86–89 are perforated, as at 95, and their extreme lower edges 96 merge with the shell walls. Lowermost curved inner wall 85 omits the perforated portion and does not merge with the shell. A connection 97 provides for admission of solvent to the upper part of the vessel. Connections 98 and 99 provide for discharge, respectively, of the raffinate and extract. Connection 101 is for the feed. A directing baffle 102 projects from the upper shell just below solvent connection 97. This form may be used in a variety of processes involving contacting of two liquids of different densities, for instance, water washing of gasoline or other absorptive or washing operations. The feed is admitted through bottom connection 101 and fills the vessel, ultimately emerging through raffinate connection 98. A relatively heavy solvent is then admitted at 97, passes along guide baffle 102 to the remote side of upper tray 79, returns transversely across the tray, travels downwardly through downcomer 94 emerging through the perforated portion of skirt plate 89, thence flows through the slotted, interfitting walls of sections 74 and 73 into the latter section. The heavier solvent continues downwardly, traversing the trays back and forth until it reaches the extreme bottom of the vessel where it is drawn off at 99 carrying with it a dissolved component of the feed.

As in the previous forms, the disposition of the trays longitudinally of the horizontal tubular sections makes it possible to substantially increase the areas of the trays and the capacity of the apparatus without increasing the diameter of the cylindrical sections or the thickness of wall thereof. Likewise, the apparatus is able to withstand substantially greater pressures than conventional vertical towers of like capacity, since the diameters of the cylindrical sections can be substantially reduced and the resistance to internal stresses thereby increased.

It has been found that with the arrangements shown, for instance, in FIGS. 1 and 6, there may be some tendency for the sections to break apart at their welded junctions, particularly when subjected to high internal fluid pressures. The form in FIGS. 7 and 8 provides reinforcement which enables the treating vessel to safely withstand very much higher internal pressures. In this form, a plurality of partially cylindrical tank sections 105–111 are assembled in vertical, laterally-staggered relationship, somewhat as in FIGS. 1 and 5. Inside the tank sections are provided tray structures 112–118 which extend longitudinally within the sections and from one side thereof to the weir forming upper extremities of inner skirt walls 119–125 forming downcomers 126–132 at the opposite sides. Operating connections are shown at 133 and 134.

Upper tank section 111 is segmentally cut away at the lower left-hand quadrant, as at 135, and there is welded over this quadrant a plate 136 having apertures 137. The next lower tank section 110 is segmentally cut off at its upper and lower right-hand quadrants, as at 138 and 139. The upper right-hand quadrant is then welded to the exposed face of apertured plate 136, and another apertured plate 140 is welded to the lower right-hand quadrant of the section. The two plates 136 and 140 are then welded together at their intersecting adjacent ends, as at 141. This procedure is followed for all of the succeeding tank sections until bottom tank section 105 is reached. This latter section is segmentally cut off in its upper left quadrant only and provided with a welded apertured plate 142 which is welded at its upper edge, as at 143, to the next higher apertured closure plate 144.

I have found that internal fluid pressures within a vessel of the type illustrated reacting against the shell, as indicated by the arrows 148 and 149, substantially stress the junctions between adjoining casing sections. These forces, in the present form, are resisted by the angled, apertured plates 136, 140, 144, 142, etc., which form tension chord braces for this purpose, but the corner welds 141, 143, etc., between these plates are not unduly stressed, nor is there resultant twisting or bending of the angled reinforcing plates.

One advantage of the devices herein illustrated, particularly as applied to gas-liquid contact or separation devices, is that liquid entrainment is not a serious problem and much higher vapor velocities may be employed than in conventional vertical tower arrangements. This is because there is no direct boiling contact between the liquid upon one tray and the tray above it. Under conditions of flooding or excessive boiling, the bulk of the agitated liquid will strike the top of its shell section and will fall back on the tray or be channeled down the downcomers. Also, ordinarily, liquid entrainment in the vapors is not serious since these vapors normally will be eliminated by changes of direction and contact with the section walls or baffles which the vapor encounters in moving horizontally along each section and thence into an upper section. The short, substantially horizontal paths of liquids, also, will minimize liquid entrainment even with relatively high velocity liquid and vapor movements. Thus, relatively high liquid velocities are made possible with the use of the present invention while, at the same time, adequate rectifying plate area is provided to insure that the gases rise through the plates at a slow enough rate to prevent blowout of bubble caps or related failure of vapor-liquid contacting instrumentalities. The relatively large rectifying tray area with a relatively smaller cross-sectional area of the vessel results in improved efficiency and capacity as well as a saving of material without loss of strength over heretofore conventional vertical towers.

It may be noted that the overall vertical spacing of the trays in my apparatus is much less than in conventional vertical towers. As an example, with my fractionating apparatus, the plates may be spaced apart on the order of 8 to 10 inches as compared to conventional spacing of 18 to 24 inches in a functionally-equivalent tower of conventional form. Since the herein-disclosed vessels are of substantially less height than previous vessels for the same purposes, less elaborate raising and supporting means may be used, resulting in considerable saving in installation and maintenance.

Another advantage of the herein-disclosed invention is that, even though trays of substantial area may be provided, the weirs and downcomers are located, preferably, across the shorter dimensions so that that there is less tendency of the liquid to unequally pile up on the trays.

The safety features of the present invention are also of importance, since in the conventional vertical tower a rupture of the vessel is an extremely serious matter as, for instance, where highly combustible petroleum is being handled. Upon rupture, the conventional fractionating tower usually splits down the side starting at the weakest point and splitting open from top to bottom. A break of such magnitude is virtually impossible with my apparatus wherein a split in a cylindrical wall necessarily would be limited to a single section. Of course, such damaged section may be individually repaired or bodily replaced. Moreover, a fire in one of the herein-disclosed sections likely would be limited thereto, rather than passing quickly upwardly through the entire vessel.

While the cylindrical shaping of the tank sections is exemplary, other shapes may be used. The lengths of the sections may be increased where greater tray capacity is desired without, of course, altering the diameters of the sections or their wall thickness. As indicated heretofore, the novel structure lends itself to various chemical and physical processes involving the use of trayed casings, tanks, or pipes.

The invention may be modified in various respects as will occur to those skilled in the art, and the exclusive use of all modifications as come within the scope of the appended claims is contemplated.

I claim:

1. A fluid treating apparatus comprising a plurality of generally cylindrical casing sections with confronting side walls and disposed serially and with their axes horizontally, the confronting side wall portions of said sections having connecting apertures and being sealingly secured together to form a continuous fluid path through the apparatus and diametrically across all of said sections, tray structures diametrically traversing at least some of said sections, and feed and discharge connections in the apparatus walls for causing fluid flow progressively through the apparatus and transversely across said sections and said trays whereby the capacity of the apparatus may be increased by increase of the lengths of said sections, said tray structures, and said connecting apertures and independently of the diameter of said sections.

2. A fluid treating apparatus as described in claim 1 in which said sections are secured together in side-by-side abutting relationship.

3. A fluid treating apparatus as described in claim 2 in which major portions of the confronting side walls of said sections are apertured to provide said interconnecting passaging between adjacent sections.

4. A fluid treating apparatus as described in claim 3 in which said confronting portions of said section side walls are provided with alternate circumferential interfitting slots and ribs forming tortuous interconnecting passaging between the sections.

5. A fluid treating apparatus as described in claim 2 in which a plurality of said sections are provided with longitudinally extending trays.

6. A fluid treating apparatus as described in claim 1 in which said sections abut at quadrants of said side walls, said sections being staggered from side to side in ascension.

7. A fluid treating apparatus as described in claim 1 in which said sections abut at the tops and bottoms thereof to form a vertically erect vessel.

8. A fluid treating apparatus as described in claim 3 in which tension chord braces extend across the confronting apertured walls of said sections.

9. A fluid treating apparatus as described in claim 1 in which the segmental confronting portions of said sections are open, the vessel further including apertured reinforcing structures spanning and secured to said confronting wall portions.

10. A fluid treating apparatus as described in claim 9 in which said reinforcing structures each comprises an elongated, apertured plate sealingly, secured at its edges to the joined parts of adjacent section walls, adjacent ones of said plates intersecting and being rigidly secured together to form a continuous reinforcement extending along the vessel.

References Cited

UNITED STATES PATENTS

| 2,682,453 | 6/1954 | Holder et al. | 23—270.5 |
| 2,759,883 | 8/1956 | Thurman. | |
| 3,151,042 | 9/1964 | Koshoot | 202—158 X |

FOREIGN PATENTS 891,464  12/1943  France.

HARRY B. THORNTON, Primary Examiner.

E. H. RENNER, Assistant Examiner.

UNITED STATES PATENT OFFICE
CERTIFICATE OF CORRECTION

Patent No. 3,345,049                  September 3, 1967

Raymond D. McGlothlin

It is hereby certified that error appears in the above numbered patent requiring correction and that the said Letters Patent should read as corrected below.

Column 2, line 71, for "ot" read -- to --; column 6, lines 32 and 33, for "interconnecting passaging" read -- continuous fluid path --; line 46, after "which" insert -- the intermediate ones of --; line 52, strike out "segmental"; same line 52, for "sections" read -- section walls --.

Signed and sealed this 12th day of November 1968.

(SEAL)

Attest:

Edward M. Fletcher, Jr.                  EDWARD J. BRENNER

Attesting Officer                        Commissioner of Patents